(12) United States Patent
Nielsen

(10) Patent No.: US 12,066,826 B2
(45) Date of Patent: *Aug. 20, 2024

(54) STILL IMAGE OPTIMIZED FLIGHT PATHS FOR FIXED CAMERA UAVS

(71) Applicant: Snap Inc., Santa Monica, CA (US)

(72) Inventor: Simon Nielsen, Beverly Hills, CA (US)

(73) Assignee: Snap Inc., Santa Monica, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 17/836,815

(22) Filed: Jun. 9, 2022

(65) Prior Publication Data

US 2022/0299996 A1    Sep. 22, 2022

Related U.S. Application Data

(63) Continuation of application No. 16/833,527, filed on Mar. 28, 2020, now Pat. No. 11,378,959.

(51) Int. Cl.
*H04N 23/695* (2023.01)
*G05D 1/00* (2006.01)

(52) U.S. Cl.
CPC ......... *G05D 1/0094* (2013.01); *G05D 1/0808* (2013.01); *G05D 1/101* (2013.01); *H04N 23/695* (2023.01)

(58) Field of Classification Search
CPC ............................ G05D 1/0094; G05D 1/0808

USPC ......................................................... 348/116
See application file for complete search history.

(56) References Cited

U.S. PATENT DOCUMENTS

| | | | |
|---|---|---|---|
| 8,229,641 B2 | 7/2012 | Clothier | |
| 11,378,959 B1 | 7/2022 | Nielsen | |
| 2016/0062364 A1 | 3/2016 | Foinet et al. | |
| 2016/0306351 A1* | 10/2016 | Fisher | G05D 1/0044 |
| 2016/0364989 A1* | 12/2016 | Speasl | G08G 5/0069 |
| 2017/0364094 A1* | 12/2017 | Yang | G03B 15/006 |
| 2018/0039271 A1 | 2/2018 | Rimoux et al. | |
| 2020/0338392 A1* | 10/2020 | Thörn | G05D 1/0094 |

FOREIGN PATENT DOCUMENTS

| | | |
|---|---|---|
| CN | 211529197 U | 9/2020 |
| WO | 2007033033 A2 | 3/2007 |
| WO | 2020119731 A1 | 6/2020 |

* cited by examiner

*Primary Examiner* — Amir Shahnami
(74) *Attorney, Agent, or Firm* — Culhane PLLC; Stephen J. Weed

(57) ABSTRACT

A UAV having a fixed camera (e.g., without a gimbal or having a manually adjustable gimbal), and a control system configured to establish a still camera position at an image capture point for an extended time at a predetermined pitch angle. This implementation allows a camera fixed to the UAV to capture a photo(s) at a pitch angle for a predetermined image capture time, given that there is enough space to obstacles/ground to avoid a crash. The control system plans the optimum flight path for achieving minimal movement for a given position and camera angle.

20 Claims, 6 Drawing Sheets

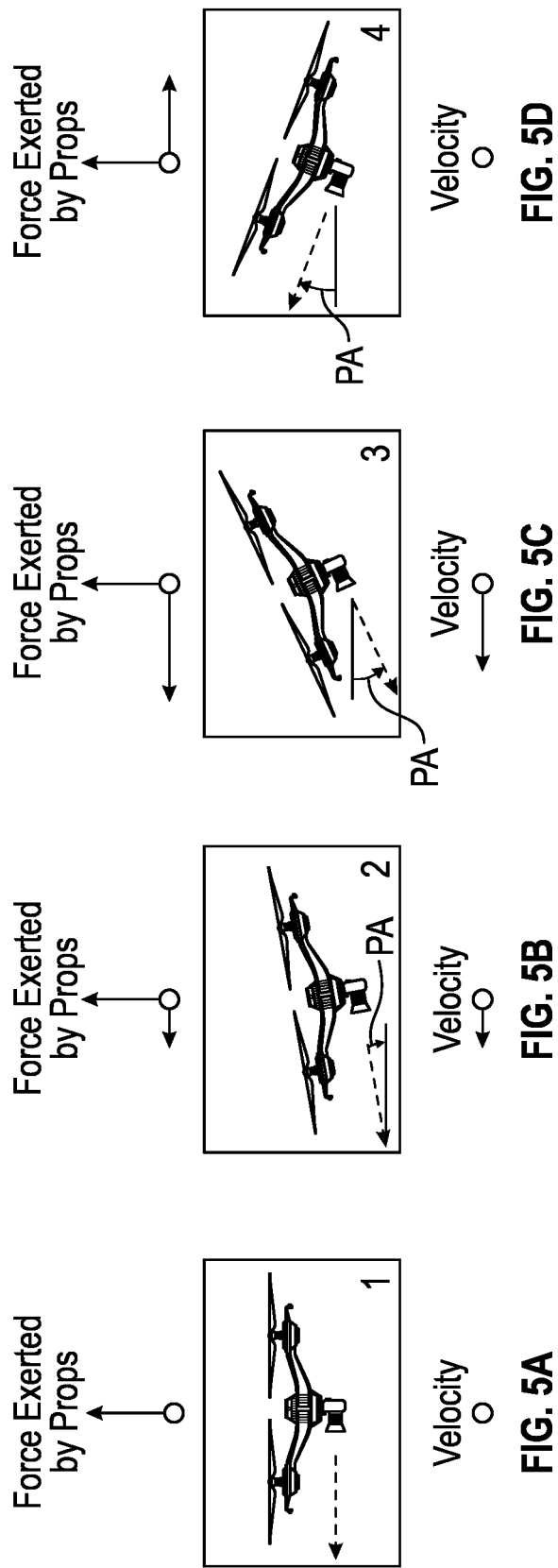

| Way Point | Direction | Altitude | Velocity | Camera Pitch Angle |
|---|---|---|---|---|
| WP1 | D1 | A1 | V1 | PA1 |
| WP2 | D2 | A2 | V2 | PA2 |
| WP3 (CP1) | D3 | A3 | V3 | PA3 |
| WP4 | D4 | A4 | V4 | PA4 |
| WP5 (CP2) | D5 | A5 | V5 | PA5 |
| ... | ... | ... | ... | ... |
| WPN | DN | AN | VN | PAN |

FIG.7

STILL IMAGE OPTIMIZED FLIGHT PATHS FOR FIXED CAMERA UAVS

CROSS-REFERENCE TO RELATED APPLICATIONS

This application is a continuation of U.S. application Ser. No. 16/833,527 filed on Mar. 28, 2020, the contents of which are incorporated fully herein by reference.

TECHNICAL FIELD

The present disclosure generally relates to unmanned aerial vehicles (UAVs).

BACKGROUND

UAVs, including drones, are aircraft without a human pilot aboard. Conventional drones have various configurations (e.g., multiple rotors), and a camera. Multirotor drones are able to capture images during flight using the camera.

BRIEF DESCRIPTION OF THE DRAWINGS

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which:

FIGS. 5A, 5B, 5C, and 5D illustrate a method of the control system operating the UAV according to the automatically determined flight path stored in memory to establish an upward camera angle facing a target for a predetermined time;

FIG. 7 illustrates a data table containing an example flight path FP2 stored in memory.

DETAILED DESCRIPTION

Figure 1:
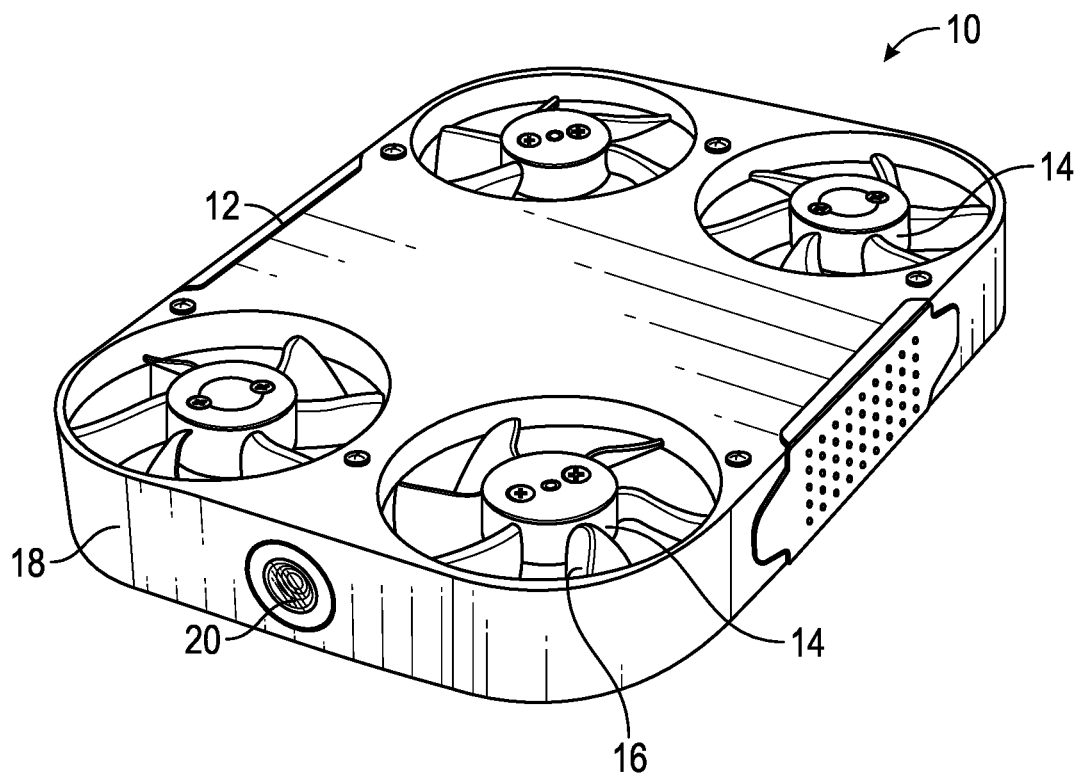
FIG. 1 illustrates a perspective view of an example UAV with a fixed camera.

This disclosure provides a UAV having a fixed camera (e.g., without a gimbal or having a manually adjustable gimbal), and a control system configured to establish a still camera position at an image capture point for an extended time at a predetermined pitch angle. This implementation allows a camera fixed to the UAV to capture a photo(s) at a pitch angle for a predetermined image capture time, given that there is enough space to obstacles/ground to avoid a crash. The control system plans the optimum flight path for achieving minimal movement for a given position and camera angle.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The description that follows includes systems, methods, techniques, instruction sequences, and computing machine program products illustrative of examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

The terms and expressions used herein are understood to have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below.

Commercial UAVs typically include a camera for imaging the earth and other objects below, for instance, capturing still images and film. In some versions, the camera is fixed to the UAV, without the use of a gimbal for selectively positioning the camera. In other versions, the camera is fixed to the UAV with a manually adjustable gimbal such that the pitch angle cannot be changed during flight. More complicated UAVs include an electronic receiver and an electronically configurable gimble and camera. A remotely located controller establishes a wireless link with the receiver of the UAV to control the gimble and camera. The electronic receiver, electrically controllable gimbles, and cameras are expensive, fragile, and mechanically complex, and add to the weight and bulkiness of the UAV.

FIG. 1 illustrates a perspective view of a UAV 10 having a body 12 and a plurality of propellers 14 including multiple blades 16. The propeller 14 including blades 16 can be made out of metal or non-conductive material. Typically, non-conductive materials, such as plastic, are used since they are lighter.

Also shown in FIG. 1 is a camera 20 fixed to the body 12 at one side thereof shown at 18 at a fixed pitch angle with respect to the body 12. In this example, the camera 20 is facing horizontal from the body 12 so that the camera pitch angle is zero degrees. In other examples, the camera pitch angle can also be fixed at other pitch angles, such as −5 degrees downward from horizontal, or other pitch angles as desired; or can have a manually adjustable gimbal for fixing such pitch angles prior to flight.

Figure 2:
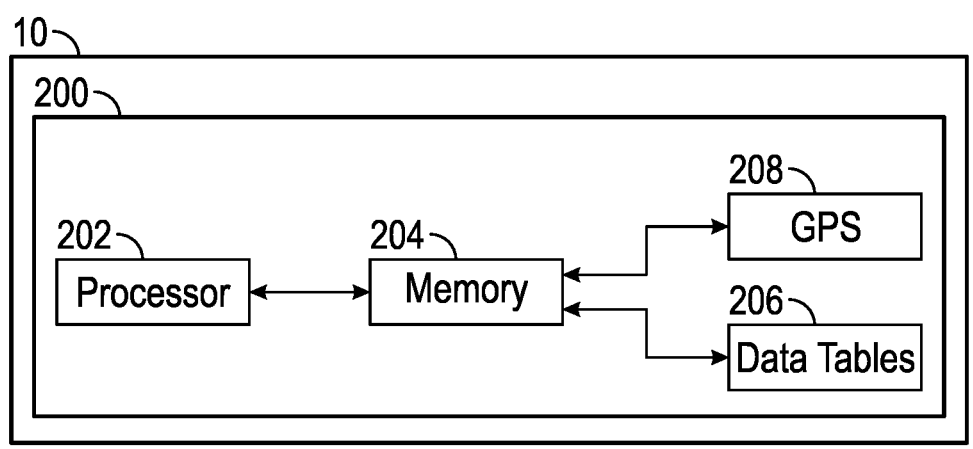
FIG. 2 illustrates control system configured to automatically control the UAV, including UAV operation along a flight path FP and at image capture points.

FIG. 2 illustrates control system 200 configured to automatically control the UAV 10, including UAV operation along a flight path FP. The control system 200 includes an electronic processor 202, comprising the flight controller, a memory 204 including flight plans and instructions and code for operating processor 202 to control and operate the UAV 10, data tables 206 stored in memory 204, and a global positioning system (GPS) receiver 208 for providing global positioning of the UAV 10. The electronic processor 202 establishes the FP of the UAV 10 based on performance data in data tables 206 and the GPS 208. Multiple flight paths are stored in memory 204, wherein the flight paths can be custom programmed and downloaded by into memory 204 by a user of the UAV 10 wirelessly or by a cable.

Figure 3:
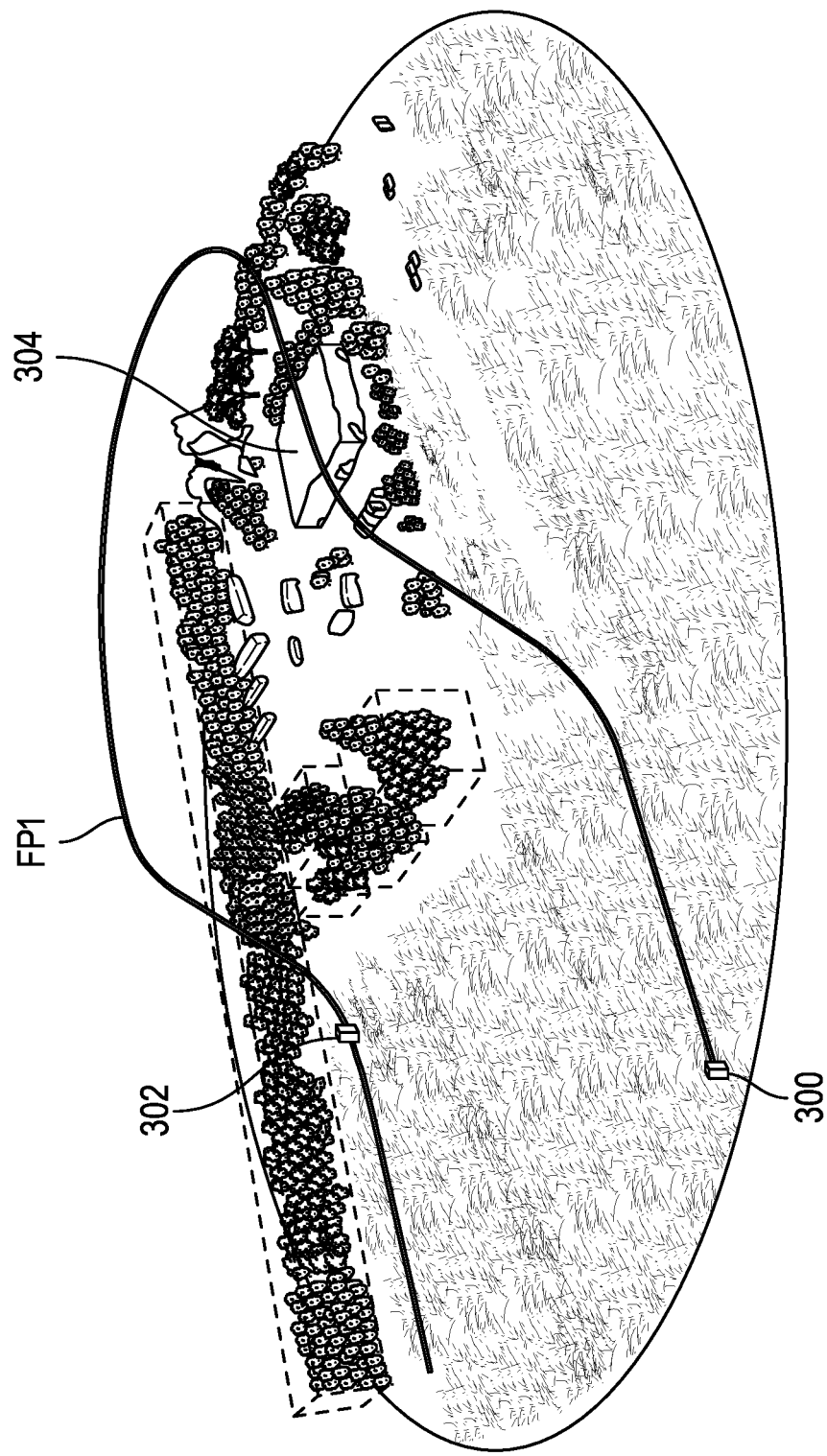
FIG. 3 illustrates a graphical representation of a flight path FP1 that routes the UAV.

FIG. 3 illustrates a graphical representation of a flight path FP1 that routes the UAV 10 from a starting position 300 to an end position 302. The FP1 routes the UAV 10 along a smooth path at varying altitudes to a target(s) 304, also referred to as a point of interest (POI). The target 304 can comprise of many features including buildings, trees, people etc. The limited or restricted spacing around the target 304 constrains and may limit the maneuvering of the UAV 10 about target 304, and thus the camera imaging. This spacing creates difficulty for the UAV 10 having a fixed position camera 20.

Figure 4:
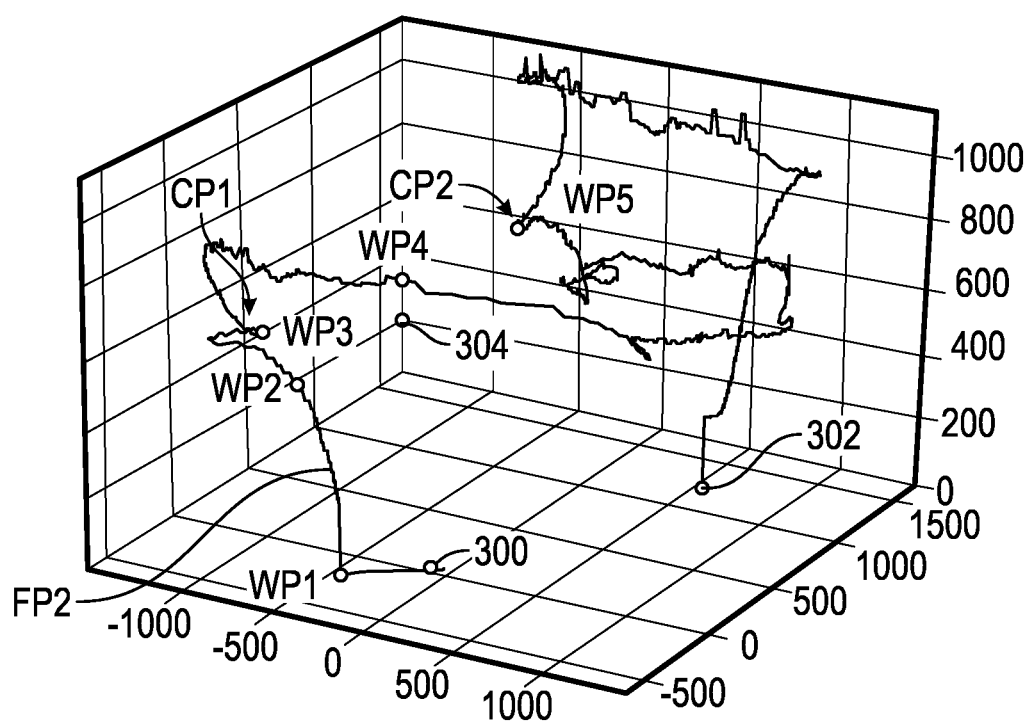
FIG. 4 illustrates a graphical representation of a more complex flight path FP2 that the UAV traverses to and about a target.

FIG. 4 illustrates a graphical representation of a more complex flight path FP2 that the UAV 10 traverses to and about target 304. The flight path FP2 includes multiple waypoints WP and multiple image capture points including image capture points CP1 and CP2. The flight path FP2 also includes performance variables of the UAV 10, and the orientation of the UAV 10 including a pitch angle PA of the camera 20 with respect to horizontal at each waypoint, including proximate the image capture points CP1 and CP2. In this example, the UAV 10 traverses the flight path FP2 having multiple waypoints to image capture point CP1 proximate the target 304. An example flight path FP2 is shown in FIG. 7 and will be discussed more shortly.

In an example, the flight path FP2 orients the UAV 10 such that the camera 20 (and the side of body 12) is directed upwardly at a pitch angle PA3 facing target 304 when approaching, and at, image capture point CP1. The camera 20 captures images of target 304 at image capture point CP1 for a predetermine image capture time and stores the images in memory 204. The UAV 10 subsequently traverses flight path FP2 to image capture point CP2 proximate target 304. The flight path FP2 also orients the UAV 10 such that the camera 20 (and the side of body 12) is directed downwardly at a pitch angle PA5 toward target 304. The camera 20 again captures images at image capture point CP2 and stores the images in memory 204.

Since the camera 20 is fixed to body 12 at the fixed pitch angle, orienting the UAV 10 in a predetermined stable position at an angle is not an ordinary task. More importantly, establishing a predetermined camera angle of the camera 20 relative to the target 304 at capture points CP1 and CP2, is not an ordinary task. The flight paths are automatically determined by electronic processor 202 based upon the GPS position of the capture points CP1 and CP2, and the desired camera pitch angle at capture points CP1 and CP2. The processor 202 determines the operational parameters of the UAV 10, as shown in FIG. 7, and takes into account the weight and flight performance of the UAV 10. The determined flight paths increase the image capture time at capture points CP1 and CP2, at the desired pitch angle, which is very beneficial for imaging.

Referring to FIGS. 5A-5D, there is shown a method of the control system electronic processor 202 operating the UAV 10 according to the automatically determined flight plan FP2 stored in memory 204. The flight plan FP2 establishes the altitude and orientation of the UAV 10 along flight path FP2, and at the capture point CP1, and also the force exerted by the propellers 14 to control the UAV 10.

As shown in FIG. 5A, at the starting position 300 of the flight path FP2, the UAV 10 is hovering above the earth. As shown above the image, the force exerted by the propellers 14 is upwardly to balance the UAV 10 against a gravitational force, and the UAV 10 is still.

As shown in FIG. 5B, a forward propeller force starts to move the UAV 10 forward at a programmed velocity V. As shown, there is both an upward and a left lateral force exerted by the propellers 14, and no change in altitude. The camera 20 captures images in the slightly downward direction from horizontal at a negative pitch angle PA as the UAV traverses along flight path FP2.

As shown in FIG. 5C, a greater forward propeller force accelerates the UAV 10 forward before quickly pivoting the UAV 10 backward as shown in FIG. 5D. As shown, there is both an upward and a left lateral force exerted by the propellers 14, and no change in altitude. The camera 20 captures images in a more downward direction from horizontal at a negative pitch angle PA as the UAV traverses along flight path FP2.

As shown in FIG. 5D, as the UAV 10 approaches image capture point CP1, the propellers 14 pitch the UAV 10 backwards by exerting an upward and right lateral force, such that the camera 20 is now angled upward at a programmed pitch angle PA. The forward momentum of UAV 10 carries the UAV 10 forward for an image capture time before coming to a full stop at the capture point CP1. An analogy is the UAV 10 skids in the air in a direction D before coming to a complete stop at capture point CP1, while the camera 20 is angled upwardly at the programmed positive pitch angle PA and viewing the target 304.

In an example, the UAV 10 is programmed such that the camera 20 is directed at the target 304 for a programmed image capture time, such as 1 second, at a pitch angle, such as +25 degrees. The programmed image capture time is defined as the time from when the camera 20 frames the target 304 at a start waypoint WP as determined by the GPS 208, until it reaches image capture point CP1. This programmed image capture time is accomplished by programming the velocity V of the UAV 10 before it starts braking at the start waypoint WP, and also controlling the braking to decelerate the UAV 10 until it reaches the image capture point CP1. The programmed pitch angle PA is a function of, and is determined by, the amount of braking force. For instance, the harder the braking force, the greater the pitch angle PA and a shorter programmed image capture time for the camera 20 to capture images of the object 304 at pitch angle PA. Conversely, the softer the braking force, the less of the pitch angle PA, and the greater programmed image capture time for the camera 20 to capture images of the object 304 at pitch angle PA.

Referring to FIGS. 6A-6D, there is shown a method of the control system electronic processor 202 operating the UAV 10 according to the automatically determined flight plan FP2 stored in memory 204 as the UAV 10 approaches the capture point CP2, including the directional force exerted by the propellers 14 to control the UAV 10.

Figure 6A:
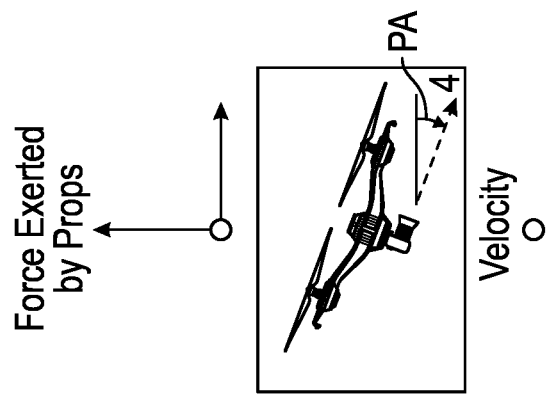
FIGS. 6A, 6B, 6C, and 6D illustrate a method of the control system operating the UAV according to the automatically determined flight path stored in memory to establish a downward camera angle facing a target for a predetermined time.

As shown in FIG. 6A, the UAV 10 is hovering above the earth. As shown above the image, the force exerted by the propellers 14 is upwardly to balance the UAV against a gravitational force, and the UAV 10 is still.

Figure 6B:
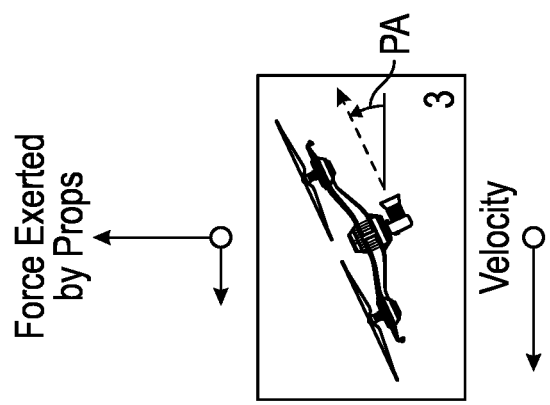

As shown in FIG. 6B, a backward propeller force starts to move the UAV 10 backward at a programmed velocity V. As shown, there is both an upward and a left lateral force exerted by the propellers 14, and no change in altitude. The camera 20 captures images in the slightly upward direction from horizontal at a positive pitch angle PA as the UAV traverses along flight path FP2.

Figure 6C:
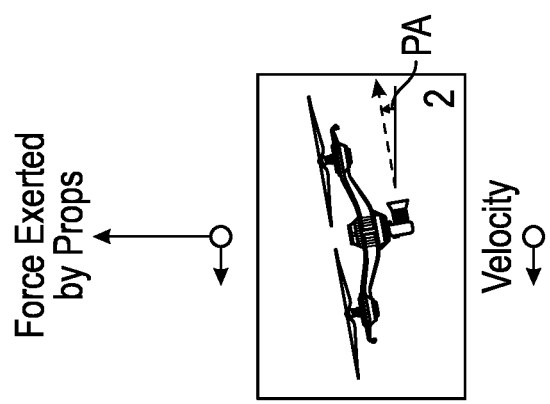
Figure 6D:
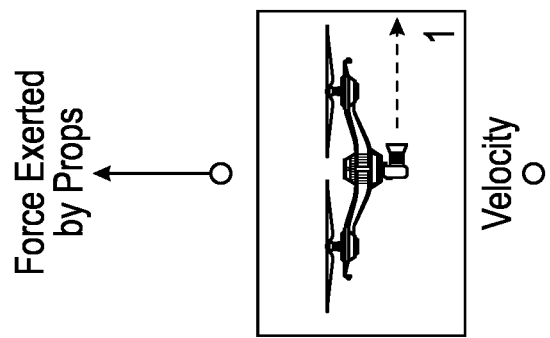

As shown in FIG. 6C, a greater backward propeller force accelerates the UAV 10 backward before quickly pivoting the UAV 10 forward as shown in FIG. 6D. As shown, there is both an upward and a left lateral force exerted by the propellers 14, and no change in altitude. The camera 20 captures images in a more upward direction from horizontal at a positive pitch angle PA as the UAV traverses along flight path FP2.

As shown in FIG. 6D, as the UAV 10 approaches image capture point CP2, the UAV 10 is pitched forward by the propellers 14 by exerting an upward and right lateral force, such that the camera 20 is now angled downward at a programmed pitch angle. The backward momentum of UAV 10 carries the UAV 10 backward for a programmed image capture time before coming to a full stop at the capture point CP2.

During the slowing of the UAV 10, and also when the UAV 10 comes to the full stop at image capture point CP2, the orientation of the camera 20 is angled downwardly at a programmed pitch angle and facing the target 304. The automatically determined flight path FP2 allows increased image capture time for camera 20 while the UAV 10 remains at the predetermined pitch angle.

A data table 206 for an example flight path FP2 stored in memory 204 is shown in FIG. 7. For each waypoint WP in the flight path PF2, the performance variables of the UAV 10 are programmed, including direction D, altitude A, velocity V, and the camera pitch angle PA. In the described examples shown in FIG. 5A-5D and FIG. 6A-6D, the performance variables are programmed to achieve the desired camera programmed time for image capture and pitch angle along the waypoints, and particularly when the UAV 10 approaches the capture points CP1 and CP2.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

What is claimed is:

1. An unmanned aerial vehicle (UAV), comprising:
   at least one propeller;
   a camera; and
   a control system configured to establish a pitch angle of the camera with respect to horizontal proximate an image capture point, wherein the control system is configured to determine a velocity and braking force of the UAV as the UAV approaches the image capture point to establish the pitch angle.

2. The UAV as specified in claim 1, wherein the control system includes a memory containing a flight path including the image capture point and is configured to automatically control the UAV along the flight path.

3. The UAV as specified in claim 1, wherein the control system is configured to automatically determine the velocity and the braking force of the UAV as a function of a predetermined image capture time.

4. The UAV as specified in claim 1, wherein the pitch angle is predefined.

5. The UAV as specified in claim 1, wherein the control system comprises a global positioning system (GPS) receiver, wherein the control system is configured to orient the UAV at the image capture point using the GPS receiver.

6. The UAV as specified in claim 2, wherein the flight path includes a plurality of waypoints.

7. The UAV as specified in claim 6, wherein the flight path includes a direction, altitude, velocity, and the camera pitch angle of the UAV as the UAV approaches the image capture point.

8. The UAV as specified in claim 6, wherein the flight path includes a direction, altitude, and velocity of the UAV at each of the waypoints.

9. A method of operating an unmanned aerial vehicle (UAV), comprising at least one propeller, a camera, and a control system configured to establish a pitch angle of the camera with respect to horizontal proximate an image capture point, wherein the control system determines a velocity and braking force of the UAV as the UAV approaches the image capture point to establish the pitch angle.

10. The method as specified in claim 9, wherein the control system includes a memory containing a flight path including the image capture point and is configured to automatically control the UAV along the flight path.

11. The method as specified in claim 9, wherein the control system automatically determines the velocity and the braking force of the UAV as a function of a predetermined image capture time.

12. The method as specified in claim 9, wherein the pitch angle is predefined.

13. The method as specified in claim 9, wherein the control system comprises a global positioning system (GPS) receiver, wherein the control system orients the UAV at the image capture point using the GPS receiver.

14. The method as specified in claim 10, wherein the flight path includes a plurality of waypoints.

15. The method as specified in claim 14, wherein the flight path includes a direction, altitude, velocity, and the camera pitch angle of the UAV as the UAV approaches the image capture point.

16. The method as specified in claim 14, wherein the flight path includes a direction, altitude, and velocity of the UAV at each of the waypoints.

17. A non-transitory computer-readable medium storing program code which, when executed, is operative to cause a computing device of an unmanned aerial vehicle (UAV) comprising at least one propeller, a camera, and a control system configured to establish a pitch angle of the camera with respect to horizontal proximate an image capture point, to perform the steps of:

determining a velocity and braking force of the UAV as the UAV approaches the image capture point to establish the pitch angle.

18. The non-transitory computer-readable medium as specified in claim 17, wherein the control system includes a memory containing a flight path including the image capture point and is configured to automatically control the UAV along the flight path.

19. The non-transitory computer-readable medium as specified in claim 17, wherein the program code, when executed, is operative to cause the control system to automatically determine the velocity and the braking force of the UAV as a function of a predetermined image capture time.

20. The non-transitory computer-readable medium as specified in claim 17, wherein the control system comprises a global positioning system (GPS) receiver, wherein the control system is configured to orient the UAV at the image capture point using the GPS receiver.

* * * * *